April 30, 1940.  W. HOWALD  2,199,314
TWO-STROKE INTERNAL COMBUSTION ENGINE
Filed Jan. 19, 1938   3 Sheets—Sheet 2
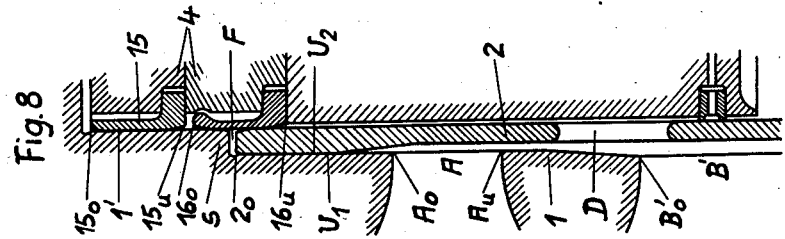
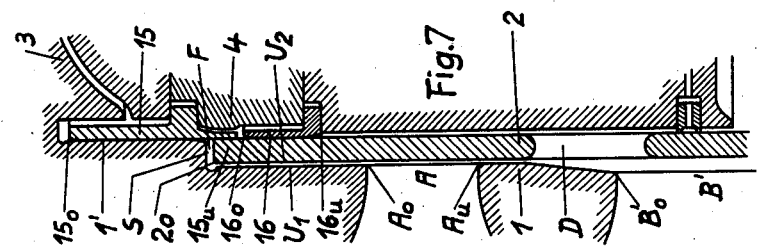
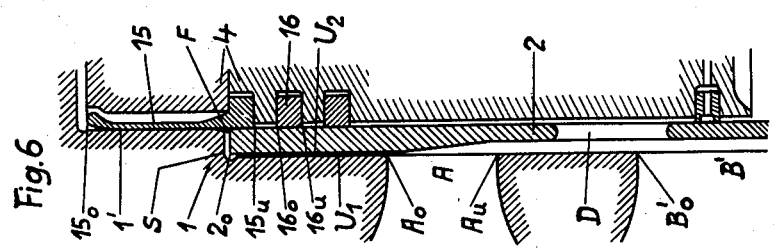
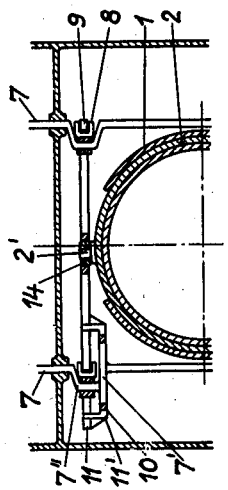
Inventor
Werner Howald
By Blinger, atty.

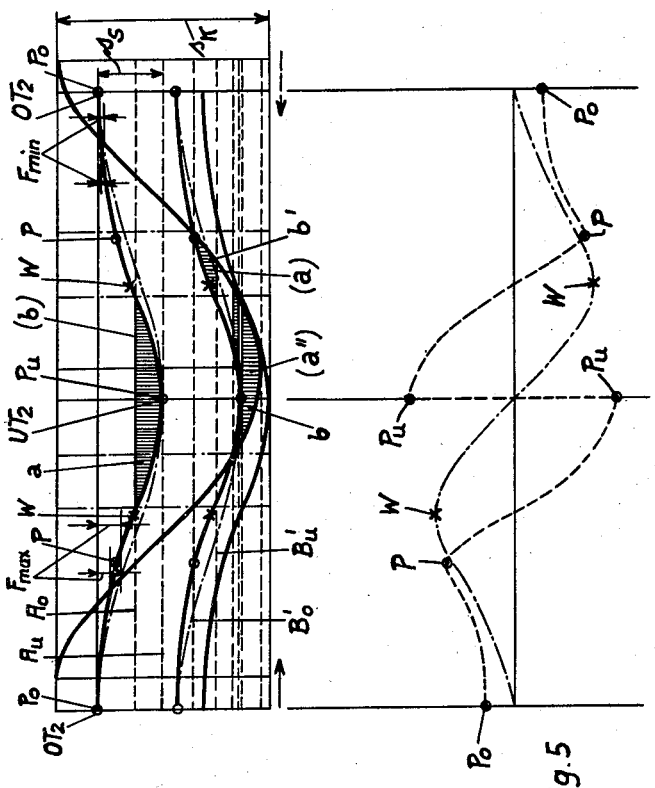

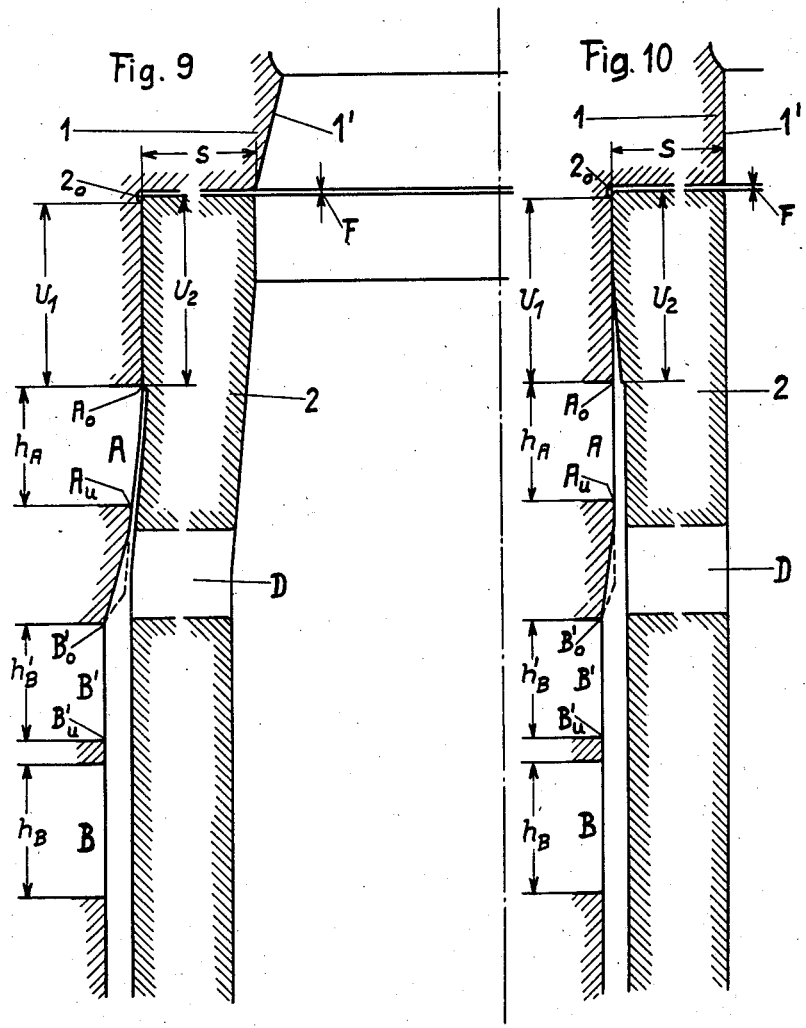

Patented Apr. 30, 1940

2,199,314

UNITED STATES PATENT OFFICE 2,199,314

TWO-STROKE INTERNAL COMBUSTION ENGINE

Werner Howald, Zurich, Switzerland

Application January 19, 1938, Serial No. 185,749
In Germany January 27, 1937

11 Claims. (Cl. 123—81)

This invention relates to a two-stroke internal combustion engine with a sleeve valve inserted between the piston and the cylinder wall, the said sleeve valve moving relatively to the piston and controlling with its outer end the inlet and/or outlet openings of the cylinder.

The main object of the invention resides in the new arrangement of the new tightening means between the inner cylinder and the outer surface of the sleeve valve in such a way that the sleeve valve and the packing surfaces are protected from direct contact with the highly heated and energetically whirling combustion gases during the duration of the maximum compression and combustion pressures. I attain this object by disposing the said packing surface and controlling and dimensioning the sleeve valve so that the packing surface and the outer end of the sleeve valve are covered by a part of the piston wall when the piston is in its outer dead-center position.

The nature and characteristic features of the invention will be readily understood from the following description, taken in connection with the accompanying drawings forming part thereof, in which Figs. 1 and 3 show diagrammatically two longitudinal sections of an internal combustion engine according to the invention.

Fig. 2 is a horizontal section on the line 2—2 of Fig. 1.

Figs. 4 and 5 show a corresponding control diagram and velocity and acceleration-time diagram.

Figs. 6 to 10 show various forms of construction of the packing elements as also indicate separate precautions to be observed in the shaping thereof.

In Figs. 1 to 10 the following references are used: 1 is the working cylinder with the gliding surface 1' for the piston, the exhaust ports A, the scavenging ports B and the charging ports B'.

$A_0$ is the upper fixed edge of the exhaust ports, $A_u$ is the lower fixed edge of the exhaust ports.

$B'_0$ is the upper fixed edge of the charging ports and $B'_u$ is the lower fixed edge of the charging ports. S is a radial contraction recess in the gliding surface of the cylinder. The external diameter of the valve is larger by a certain amount than is the corresponding part of the cylinder bore by which it is received. This excess dimension may be reduced to the value zero, that is to say in this case the external diameter of the valve and the cylinder bore according to Figs. 8, 9 and 10 are exactly equal to one another, in the zone of the overlapping packing and control surfaces. $U_1$ is the packing overlapping surface in the cylinder. $h_A$ is the internal height of the exhaust ports, $h_B$ the internal height of the scavenging ports and $h'_B$ the internal height of the charging parts. 2 is the sleeve valve with the driving pin 2', the external controlling edge $2_0$ and the packing overlapping surface $U_2$. D are the admission and exhaust ports at the inner end of the working chamber in the valve. There is also provided an excess dimension in the zone of the packing overlapping surface at the controlling end of the valve, similar to the excess dimension in the cylinder. ss is the valve stroke. $OT_2$ is the upper dead point position of the valve and $UT_2$ the lower dead point position thereof. W is the point of maximum downward or upward velocity of the valve. P is a deceleration or acceleration maximum before or after the upper dead centre position. $P_0$ represents the acceleration at the upper dead centre point and $P_u$ the acceleration at the lower dead centre point. C is the path of movement of any point on the valve. F is the gap between the recess S in the cylinder gliding surface and the outer controlling edge $2_0$ of the sleeve valve. 3 is the cylinder cover, 4 the piston, 4' is the lateral gliding surface of the piston, $4_0$ is the controlling upper edge of the piston and $s_K$ is the piston stroke.

5 is the connecting rod, 6 is the crank shaft and 6' the working crank. 7 is the sleeve valve driving shaft, 7' is an eccentric on this shaft, 7'' is a crank on the driving shaft and R is the effective radius of this crank. 8 is the corresponding connecting rod with the effective rod length L. 9 is a driving pin with a driving link 11, 10 is an eccentric sheave. 11' is a slotted guide in the link 11. 12 is the crank case of the engine. 13 is a bearing casing for the rotary member 14 in the link 11. 15 is the upermost packing ring in the piston with the upper edge $15_0$ and the lower edge $15_u$. 16 is the second uppermost packing ring in the piston with the upper edge $16_0$ and the lower edge $16_u$.

In the internal combustion engine according to the Figs. 1, 2 and 3 and the control diagram 4, the sleeve valve carries out in addition to the reciprocating movement, also an oscillating movement, according to the drive in Figs. 1 and 2. Preferably there is however also used in connection with engines according to Figs. 1, 2 and 3 and the control diagram 4 only a reciprocating movement of the valve. The oscillating movement of the sleeve valve has solely a very favourable influence on the running properties and lubricant distribution of the valve and piston and of the piston rings and prevents the piston rings from seizing or sticking in their grooves.

In engines with the drive according to Figs. 1 and 2 the horizontal component of the movement curve C is transmitted by an eccentric 7', coaxial with the crank pin 7'' of the sleeve valve driving shaft 7 and rotating with no or almost no angular displacement relatively to the crank pin 7', through the medium of the eccentric sheave 10 to the slide guide 11' of the link 11, whilst the vertical component is transmitted from the crank pin 7'' by means of the connection rod 8 to the pivot 9, mounted in the driving link 11 and positively partaking with this in the horizontal movement. The pivot 9 therefore does not move to and fro along a straight or curved line but along a closed path corresponding with the movement path C. As a result, as the pivot 9 moves in the same direction as the crank pin 7'' but moves to a small extent from the middle position connecting rods 8 can be used, of which the length is approximately equal to the crank radius or larger or smaller than this without the angular movement of the connecting rod 8 from the vertical being unallowably large. That the ratio R/L fluctuates about 1, is one of the most important kinetic properties of this drive. In the combination R/L, R means the crank radius and L the length of the connecting rod. Of similar importance for the engine according to the invention is the fact that the maximum movement of the oscillating movement of the sleeve valve is only a fraction of the maximum reciprocating movement. When the drive is only to produce a reciprocating movement of the valve the eccentricity of the eccentric 7' must be reduced to zero and the length of the connecting rod 8 must be made somewhat longer than the crank radius R.

Figs. 1 and 3 show diagrammatically two longitudinal sections of an engine according to the invention, wherein the exhaust ports A in the cylinder are located towards the outer end or the compression space of the working chamber, whilst at the inner end of the working chamber or on the crank side of the working chamber in the cylinder 1 there are located the scavenging ports B and between these and the exhaust ports A the charging port B'. Fig. 4 shows the control diagram and Fig. 5 the valve velocity and acceleration diagram of an engine according to the invention with an average piston velocity of 12 to 16 metres per second and a normal charging pressure of 1.8 kg./cm.$^2$ at sea level. The control diagram has been formed by tabulating horizontally the time of a complete crank shaft revolution and vertically the position of the corresponding movable and fixed control edges during this time. The fixed control edges appear in parallel straight lines to the time axis, whilst the movable control edges appear as curves. The arrows indicate the direction of rotation of the crank shaft and the corresponding directions of movement in the diagrams. The ordinates of the vertically shaded areas $a$, $b$ and $b'$ show the course of the internal heights of the ports which, multiplied by the corresponding widths of the ports give the cross-sectional course of the exhaust A during exhaust into the open or into an exhaust turbine, of the admission B of the scavenging air and of the admission B' of the charging air or of the charging mixture. By reversing the direction of rotation of the crank shaft and of the sleeve valve driving shaft, or what amounts to the same thing, by turning the sleeve valve driving shaft relatively to the crank shaft through an angle which is equal to or nearly equal to a large retardation, the exhaust A, instead of taking place unseparated near the outer end of the working chamber, can take place separately at the inner working end, in a preliminary exhaust (A) to a pre-exhaust turbine and subsequent exhaust (A'') into the atmosphere or into the exhaust of the pre-exhaust turbine or into the subsequent exhaust and scavenging gas turbine, whilst the admission B of the scavenging air and the admission B' and the charging air or of the charging mixture, instead of taking place separately, takes place at the inner end of the working chamber through the admission (B) unseparated near the outer end of the working chamber. In the figure the bracketed references $(a)$, $(a')$ and $(b)$ correspond with the direction of movement indicated by the broken arrows. In the diagram 4, the ordinates of the vertical shaded areas $(a)$, $(a'')$ and $(b)$ indicate the course of the internal port heights of the exhaust (A) of the exhaust into the pre-exhaust turbine, of the exhaust (A'') of the subsequent exhaust into the atmosphere, or into the exhaust of the pre-exhaust turbine or into the subsequent exhaust and scavenging gas turbine, and of the admission (B) of the scavenging and charging air which multiplied by the corresponding port widths give the course of the internal cross-sectional area.

In the case of counterpiston engines it is possible with advantage to control the scavenging and charging ports by means of a sleeve valve and piston, whilst the other sleeve valve and piston effect the division of the exhaust into a pre-exhaust to the turbine and a subsequent exhaust into the atmosphere or directly into the exhaust of the turbine or into a subsequent exhaust and scavenging gas turbine. When it is of advantage for any reason, it is possible to provide in the upper part of the cylinder, in addition to the exhaust (A), (or inlet B), controlled by the valve, an additional exhaust or inlet, controlled by a separate control member, or it is possible in this case to entirely omit the control of the exhaust (A), (or of the inlet B), by the sleeve valve, whilst this function is carried out by a separate additional control member.

Between the control diagram and the velocity-time and acceleration-time diagram, there exists the following connection.

The velocity maxima W with the greatest tangent inclination in the path-time curve there correspond in the velocity-time diagram the points W with horizontal tangents. With the acceleration maxima P, or $P_0$ and $P_u$ in the path-time diagram there correspond the points P or $P_0$ and $P_u$ with horizontal tangents in the acceleration-time diagram.

According to the invention and as will be seen from Figs. 1, 3, and 4 the controlling end $2_0$ of the sleeve valve 2 engaging between the cylinder 1 and the piston 4 is completely screened from direct contact with the highly heated and energetically whirling combustion gases during the duration of the maximum compression and combustion pressure by the overlapping and corresponding cylinder gliding surfaces 1' and piston surfaces near the upper dead centre position $OT_K$ by the overlapping of the ledge between the controlling end $2_0$ of the sleeve valve 2 and the gliding surface 1' of the cylinder 1 constricted by a radial projection S to the sleeve valve bore, by the upper edge of the piston $4_o$. The hot combustion gases can consequently in fact only come into direct contact with the controlling end $2_o$ of the sleeve valve, either only along the path through a very narrow slot between the cylindrical piston surface 4' and the cylinder gliding surface 1' or by passing over the gap at F through a packing ring 15 according to Figs. 6, 7 and 8, at the moment when the piston 4 has already traversed a considerable portion of its downward stroke and the combustion pressure has been reduced from about 70 to 75 kg./cm.$^2$ to about 25 kg./cm$^2$ that is to say to from ½ to ⅓ its maximum pressure. The temperature of the combustion gases has decreased correspondingly and it will be seen that in the engine according to the invention, at the moment at which the piston 4, when passing over the gap at F exposes the upper edge $2_o$ of the valve, the danger of an excessive transmission of heat by contact with the combustion gases and consequently a too excessive deformation of the surfaces sliding upon one another and to be packed has already passed. From this however it follows that the precaution according to the invention is the more effective the more the controlling outer edge $2_o$ of the valve 2 is reduced. A limit is however imposed to this reduction by the valve stroke itself and the width of the gap at F which must be traversed wholly or partly during the compression and expansion stroke by the packing rings 15 in accordance with Figs. 6, 7 and 8. On the other hand the passing over is also influenced favourably by the separate valve movement which is employed and the combination thereof with the movement of the piston.

From the control diagram and the velocity-time and acceleration-time diagram it will be seen that 1. the zone of movement of maximum acceleration of the sleeve valve is identical with the lower dead centre zone of the sleeve valve movement and occurs in the period of time during which the exhaust A is open and coincides with the exception of an advance or retarding angle with the lower dead centre zone of the piston, that 2. The acceleration in the upper dead centre zone of the sleeve valve movement is very substantially smaller than the acceleration in the lower dead centre zone, that 3. between the maximum downward velocity and the upper dead centre on the one hand and the upper dead centre and the maximum downward velocity on the other hand there is located a retardation or acceleration maximum which is greater than the acceleration at the upper dead centre, and that 4. the upper piston dead centre zone has a greater acceleration than the lower piston dead centre zone.

Thus at the upper dead centre the creeping velocity change of the sleeve valve coincides with the sharp velocity change of the piston and in the lower dead centre zone the sharp velocity change of the valve coincides with the creeping velocity change of the piston.

The term dead centre zone implies a range on both sides of the dead centre. Theoretically the limit lies at the points of maximum upward and downward velocity.

From the above four points, especially however from points 1 and 2 and 3 there results that in spite of the fact that the piston 4 during its working stroke has already traversed a considerable portion of its downward stroke, before it has reached the gap at F, the latter has meanwhile only been increased to the width $F_{max}$ to be traversed. According to the positive or negative phase displacement between the sleeve valve movement and the piston movement, $F_{max}$ to be traversed lies in the working or compressing stroke, whereas $F_{min}$ then lies in the compression or working stroke.

The smallness of $F_{max}$ which is a condition for the passing over by one piston ring 15 according to Figs. 6, 7 and 8, is due to points 2 and 3 of the control according to the invention. The chain-dotted lines in the control diagram (Fig. 4) show how large $F_{max}$ and $F_{min}$ would be, if the valve movement were a simple sine or cosine function, as is the case under the most favourable conditions in all known, normal valve controls and thus the passing over by a piston ring 15 would be entirely impossible. At the same time it will also be seen from the diagram how poor the time sections for the admission and exhaust would be with a normal movement curve of this character. The setting back according to the invention, of the controlling outer sleeve valve and $2_o$ is thus also not limited on the passing of a piston ring 15, in this particular case by the gap at F, but by the minimum distance between the lower edge $A_u$ or $B_u$ of the exhaust or admission ports in the cylinder and the upper edge of the admission or exhaust ports in the sleeve valve in its upper dead centre position. In addition to the maximum time sections for exhaust and admission the characterised sleeve valve movement and its combination with the movement of the piston thus also permits of a maximum setting back of the controlling outer edge of the sleeve valve from the dangerous zone.

In order that the passing over of the gap at F either only by the upper edge of the ring or both by the upper edge of the ring as also the lower edge thereof, does not give rise to any disturbance, and the packing action, the heat transmission and the running properties between the cylinder and the sleeve valve on the one hand and the sleeve valve and cylinder and piston on the other hand are free from objection, a very particular selection of material is also required as also very particular precautions in the shaping of these parts.

When the gap at F is only traversed by the piston upper edge the shaping of the overlapping packing surfaces in the cylinder and valve and along the cylinder and valve gliding surfaces up to the end adjacent the crank, is carried out with advantage under the same or similar conditions as in the applicant's German patent application H. 143 697/46 c$^1$ filed May 16, 1935. Especially the controlling overlapping valve end is machined on its rear side with advantage partly to a minimum resilient wall thickness. Preferably however the combustion gases during the higher pressure period are kept away completely from the abutting joint by the upper edge $15_o$ according to Figs. 6 and 7 or by the upper and lower edge $15_o$ and $15_u$ of the first ring 15 and under circumstances also by the upper edge $16_o$ according to Fig. 8 of the second ring. The uppermost packing ring 15 is in this case preferably constructed as a non-split sleeve ring which is freely movable radially, that is to say self-centering, in the piston, which ring is mounted with a minimum clearance in the upper part of the sleeve valve and which from about the middle portion of the stroke bears upwardly resiliently, under the action of the internal excess pressure, and with an effective joint against the sleeve valve and cylinder wall. If the ring were cut open it would be entirely useless when only partly passing over the gap at F as the gases would pass through the cut point into the gap at F. When this non-split ring is machined partly on its rear side according to Fig. 6 to a minimum resilient wall thickness, it can be mounted even without clearance in this resilient part in the valve. In the construction in Fig. 6 for preventing damage to the gap at F by the ring which passes over this, the bore 1' of the cylinder 1 above the gap at F is enlarged by about the clearance, which the packing valve surface possesses relatively to the overlapping cylinder surface, relatively to the bore of the valve.

When according to Fig. 7 it is desired to make both bores exactly similar, the overlapping surface of the valve must not have any clearance in the overlapped surface of the cylinder in Figs. 9 and 10, or the ring in addition to the bevelling of its upper edge $15_o$ is provided at its lower edge $15_u$ with a flexible surrounding collar which relatively to the sleeve bore has either an excess dimension of the zero value and is always in engagement therewith. In this manner the uppermost ring is centered entirely automatically and there is obtained a satisfactory passage over the gap at F.

Fig. 8 shows a form of construction in which the uppermost ring 15 has passed over the gap at F both with its upper and lower edges. When the overlapping packing between the valve and the cylinder according to Fig. 8 is effected with a minimum excess dimension or is of the zero value then, as a satisfactory centering between the valve bore and the cylinder bore is provided for, the ring 16, which is somewhat larger in diameter than the uppermost ring 15, may also pass over the gap at F. The second ring in this case is preferably also not cut.

Also in connection with a water cooled engine according to Figs. 9 and 10 with a water temperature of about 80° C., all the running surfaces of the bore of the cylinder and the outer running surfaces of the sleeve valve and the two uppermost non-split packing rings, are all so selected as regards the size of their diameter along a central section, that the running surfaces are entirely or almost cylindrical under the full load working temperatures.

When the same valve and cylinder along their running surfaces have different clearances it will be understood that it is not possible to avoid conical transitory points or jumps either in the cylinder or valve running surface or in both running surfaces together even under full load working temperature. In Figs. 9 and 10 is shown an example wherein these conical transitory surfaces are partly present in the valve and partly in the cylinder running surface. Fig. 9 shows this diagrammatically and to a considerable exaggerated extent in connection with an engine when the exhaust passes out near the outer end of the working chamber. Fig. 10 shows the same cylinder under full load temperatures. Both in the cold and in the hot condition the packing, overlapping cylinder and valve surfaces $U_1$ and $U_2$ do not have any relative clearance, whilst the remaining cylinder and valve have a clearance, whilst the remaining cylinder and valve have a clearance of about 0.05 mm. From Fig. 9 it will be seen that the running surface range in the cylinder between the jump S and the outlet port upper edge $A_o$ may be constructed cylindrically as this running surface is again heated against the drop in temperature thereof downwardly by the exhaust and therefore acquires along the central section practically constant temperature, whilst the sleeve valve above the ports D up to near its outer end must be manufactured so as to be reduced as the outer end of the sleeve valve is considerably heated by the gases which flow over it at a high velocity. The running surface below the outlet ports B or D both in the cylinder and in the valve may be made cylindrical. The step between the exhaust and admission may be slightly reduced towards the exhaust.

In case the scavenging air is admitted near the outer end of the working chamber and the exhaust is passed out at the inner end of the working chamber the upper part of the sleeve valve is cooled by the scavenging air so that a part of the sleeve valve above the ports D may be made of a smaller diameter than the lower part of the sleeve valve. It is only necessary to make the portion below the outlet ports D within reach of the exhaust passage A enlarged conically downwards, as this part, similar to the upper part in Fig. 9 is heated by the outflowing exhaust gases. The lowermost part of the valve C, and also of the cylinder, is again constructed cylindrically, reversely to Fig. 9 the running surface between the jump F and the admission upper edge $B_o$ in the cylinder must be constructed reduced upwardly as the lower edge of this running surface, which is already cooler than the upper part thereof, is cooled by the admission of the scavenging air. Also in this case the separate running surfaces both of the cylinder and of the sleeve valve can be constructed with a reduced central diameter towards the compression chamber.

In order that the steps which have been taken may function satisfactorily three further conditions must be satisfied.

1. Both the heat expansion coefficients of the cylinder, of the valve and of the rings which pass over must in such a case only have minimum differences, whilst preferably the radial wall thickness of the rings which pass over as also of the valve must have a minimum value.

2. The heat conductivity, especially of the cylinder part with the running surface 1' must have as large a value as possible, which for example is not below that of the light metal.

3. The materials of the running surfaces must be so selected that they have satisfactory running properties on one another.

What I claim is:

1. In a two-stroke internal combustion engine which includes at least one cylinder with inlet and outlet openings in the cylinder wall, a piston for said cylinder, a sleeve valve movably arranged between the cylinder wall and said piston, the said sleeve valve controlling at least part of the said openings in the cylinder wall, the sleeve valve fitting tightly along packing surfaces extending around the entire circumference of the sleeve valve and the inner surface of the cylinder wall, the said packing surface on the cylinder wall and the outer end of the sleeve valve being covered by a part of the piston wall when the piston is in the outer dead centre position, a radial projection of the cylinder wall arranged above the outer controlling edge of the sleeve valve and contracting the cylinder wall to a diameter corresponding approximately to the diameter of the sleeve valve bore, the sleeve valve forming with the radial projection a gap closed towards the outside, and changing its width during the compression stroke and working stroke of the working piston, a part of the piston wall passing over the said gap when the working piston is attaining its outer dead centre position.

2. In a two-stroke internal combustion engine which includes at least one cylinder with inlet and outlet openings in the cylinder wall, a piston for said cylinder, a sleeve valve movable arranged between the cylinder wall and said piston, the said sleeve valve controlling at least part of the said openings in the cylinder wall, the sleeve valve fitting tightly along packing surfaces extending around the entire circumference of the sleeve valve and the inner surface of the cylinder wall, the said packing surface on the cylinder wall and the outer end of the sleeve valve being covered by a part of the piston wall when the piston is in the outer dead centre position, a radial projection of the cylinder wall arranged above the outer controlling edge of the sleeve valve and contracting the cylinder wall to a diameter corresponding approximately to the diameter of the sleeve valve bore, the sleeve valve forming with the radial projection a gap closed towards the outside, and changing its width during the compression stroke and working stroke of the working piston, a part of the piston wall passing over the said gap when the working piston is attaining its outer dead centre position, the radial projection and the sleeve valve being arranged in such a way that the valve does not touch the projection in the outer dead center position of the sleeve valve.

3. In a two-stroke internal combustion engine which includes at least one cylinder with inlet and outlet openings in the cylinder wall, a piston for said cylinder, a sleeve valve movably arranged between the cylinder wall and said piston, the said sleeve valve controlling at least part of the said openings in the cylinder wall, the sleeve valve fitting tightly along packing surfaces extending around the entire circumference of the sleeve valve and the inner surface of the cylinder wall, the said packing surface on the cylinder wall and the outer end of the sleeve valve being covered by a part of the piston wall when the piston is in the outer dead centre position, a radial projection of the cylinder wall arranged above the outer controlling edge of the sleeve valve and contracting the cylinder wall to a diameter corresponding approximately to the diameter of the sleeve valve bore, the sleeve valve forming with the radial projection a gap closed towards the outside, and changing its width during the compression stroke and working stroke of the piston, a part of the piston wall passing over the said gap when the piston is attaining its outer dead centre position, at least one packing ring mounted on said piston, the outermost packing ring projecting above the edge formed between piston head and piston skirt, a ring-shaped groove between cylinder running surface and cylinder head, the relative position of the sleeve valve and of the said groove being controlled so that the sleeve valve enters with its outer edge the said groove when attaining its outer dead centre position, and thereby protects the cylinder running surface from direct contact with the highly heated and compressed gases.

4. In a two-stroke internal combustion engine which includes at least one cylinder with inlet and outlet openings in the cylinder wall, a piston for said cylinder, a sleeve valve movably arranged between the cylinder wall and said piston, the said sleeve valve controlling at least part of the said openings in the cylinder wall, the sleeve valve fitting tightly along packing surfaces extending around the entire circumference of the sleeve valve and the inner surface of the cylinder wall, the said packing surface on the cylinder wall and the outer end of the sleeve valve being covered by a part of the piston wall when the piston is in the outer dead centre position, a radial projection of the cylinder wall arranged above the outer controlling edge of the sleeve valve and contracting the cylinder wall to a diameter corresponding approximately to the diameter of the sleeve valve bore, the sleeve valve forming with the radial projection a gap closed towards the outside, and changing its width during the compression stroke and working stroke of the piston, a part of the piston wall passing over the said gap when the piston is attaining its outer dead centre position, the running surface of the cylinder and preferably also the running surfaces of the sleeve valve gliding on the said running surfaces and the inner running surface of the sleeve valve cooperating with the piston being constructed from the inner end of the working chamber towards the outer end of the working chamber with a smaller, partially constantly reducing diameter.

5. In a two-cycle internal combustion engine provided with a reciprocating sleeve-valve in a cylinder, control ports in said cylinder, means to reciprocate said sleeve-valve in timed relation with the piston of said engine to close said ports at the compression and power strokes of the piston, said sleeve-valve fitting tightly along packing surfaces extending around its outer end and the inner surface of the cylinder-wall, the cylinder bore being reduced beyond the outer end-edge of said sleeve-valve by a radial projection to approximately the valve bore, the outer edge of said sleeve-valve in its outer dead center position being not in contact with the end face of said radial projection, but with this forming a narrow circumferentially extending outwardly closed gap which during the compression and working strokes is varied in axial width in consequence of the valve movement, said gap being covered by the piston during its passage through the outer dead center position and during the period of maximum pressure in the working chamber.

6. In a two-cycle internal combustion engine provided with a reciprocating sleeve-valve in a cylinder, control ports in said cylinder, means to reciprocate said sleeve-valve in timed relation with the piston of said engine to close said ports at the compression and power strokes of the piston, said sleeve-valve fitting tightly along packing surfaces extending around its outer end and the inner surface of the cylinder-wall, the cylinder bore being reduced beyond the outer end-edge of said sleeve-valve by a radial projection to the valve bore, the outer edge of said sleeve-valve in its outer dead center position being out of contact with the end face of said radial projection but with this forming a narrow circumferentially extending outwardly closed gap, which during the compression and working strokes is varied in axial width in consequence of the valve movement, said gap being passed over and packed towards the working chamber by the piston and by at least one piston ring.

7. In a two-stroke internal combustion engine provided with a reciprocating sleeve-valve in a cylinder, control ports in said cylinder, means to reciprocate said valve in timed relation with the piston of said engine to close said ports at the compression and power strokes of the piston, said sleeve-valve fitting tightly along packing surfaces extending around its outer end and the inner surface of the cylinder-wall, the cylinder bore being reduced beyond the outer end-edge of said sleeve-valve by a radial projection to the valve bore, the outer edge of said sleeve-valve in its outer dead center position being not in contact with the end face of said radial projection but with this forming a narrow circumferentially extending outwardly closed gap, which, during the compression and working strokes varied in axial width in consequence of the valve movement, said gap being passed over and packed towards the working chamber by the piston and by at least one piston ring, said piston ring being uncut and being at least partly thin and flexible, so that said ring-part bears snugly against the corresponding valve and cylinder bore.

8. In a two-cycle internal combustion engine provided with a reciprocating sleeve-valve in a cylinder, control ports in said cylinder, means to reciprocate said valve in timed relation with the piston of said engine to close said ports at the compression and power strokes of the piston, said sleeve-valve fitting tightly along packing surfaces extending around its outer end and the inner surface of the cylinder wall, the cylinder bore being reduced beyond the outer end-edge of said sleeve-valve by a radial projection to the valve bore, the outer edge of said sleeve-valve in its outer dead center position being not in contact with the end face of said radial projection but with this forming a narrow circumferentially extending outwardly closed gap which, during the compression and working stroke is varied in axial width in consequence of the valve movement, said gap being passed over and packed towards the working chamber by the piston and by at least one piston ring, means for controlling said sleeve-valve so as to attain between its outer dead center position and the two zones of maximum axial velocity a maximum of deceleration and a maximum of acceleration, the deceleration and acceleration being greater than the deceleration and acceleration in the outer dead center position.

9. In a two-cycle internal combustion engine provided with a reciprocating sleeve-valve in a cylinder, control ports in said cylinder, means to reciprocate said valve in timed relation with the piston of said engine to close said ports at the compression and power strokes of the piston, the radial wall-thickness of said sleeve-valve being thin and flexible so that it bears snugly against the cylinder wall and fits tightly along packing surfaces extending around the outer end of said sleeve-valve and the inner surface of cylinder wall, the cylinder bore being reduced beyond the outer end-edge of said sleeve-valve by a radial projection to approximately the valve bore, the outer edge of said sleeve-valve in its outer dead center position being not in contact with the end face of said radial projection but with this forming a narrow circumferentially extending outwardly closed gap, which, during the compression and working strokes is varied in axial width in consequence of the valve movement, said gap being covered by the piston during its passage through the outer dead center position and during the period of maximum pressure in the working chamber.

10. In a two-cycle internal combustion engine provided with a reciprocating sleeve-valve in a cylinder, control ports in said cylinder, means to reciprocate said valve in timed relation with the piston of said engine to close said ports at the compression and power strokes of the piston, the radial wall-thickness of said sleeve-valve being thin and flexible, so that it bears snugly against the cylinder wall and fits tightly along packing surfaces extending around the outer end of said sleeve-valve and the inner surface of said cylinder-wall, the cylinder bore and the sleeve-valve bore within the packing zone being less than the cylinder bore and the sleeve-valve bore at the innermost end of said cylinder and sleeve-valve, the cylinder bore being reduced beyond the outer end-edge of said sleeve-valve by a radial projection to approximately the valve bore, the outer edge of said sleeve-valve in its outer dead center position being not in contact with the end-face of the radial projection thus forming a narrow circumferentially extending outwardly closed gap, which, during the compression and working strokes is varied in axial width in consequence of the valve movement, said gap being covered by the piston during its passage through the outer dead center position and during the period of maximum pressure in the working chamber.

11. In a two-cycle internal combustion engine provided with a reciprocating sleeve-valve in a cylinder, control ports in said cylinder, means to reciprocate said valve in timed relation with the piston of said engine to close said ports at the compression and power strokes of the piston, the radial wall-thickness of said sleeve-valve being thin and flexible, so that it bears snugly against the cylinder wall and fits tightly along packing surfaces extending around the outer end of said sleeve-valve and the inner surface of said cylinder-wall, the cylinder bore being reduced beyond the outer end-edge of said sleeve-valve by a radial projection to an outwardly decreasing bore, the diameter of the inner end of said bore corresponding to the bore in the outer end of said sleeve-valve while tightly engaging the corresponding cylinder bore, the outer edge of said sleeve-valve in its outer dead center position being not in contact with the end-face of said radial projection thus forming a narrow circumferentially extending outwardly closed gap, which during the compression and working strokes is varied in axial width in consequence of the sleeve-valve movement, said gap being passed over and packed toward the working chamber by the piston and by at least one piston ring, said piston ring being uncut and being at least partly thin and flexible, so that said ring-part bears snugly against the corresponding valve and cylinder bore.

WERNER HOWALD.